United States Patent [19]

Haldric et al.

[11] Patent Number: 4,900,178
[45] Date of Patent: Feb. 13, 1990

[54] COUPLING DEVICE AND THE APPLICATION THEREOF IN PARTICULAR IN AN AUTOMOBILE STEERING DEVICE

[75] Inventors: Bernard Haldric; Pascal Feucht; Christian Fernand, all of Vendome, France

[73] Assignee: NACAM, Vendome, France

[21] Appl. No.: 288,553

[22] Filed: Dec. 15, 1988

[30] Foreign Application Priority Data

Dec. 31, 1987 [FR] France .................................. 87 18490

[51] Int. Cl.⁴ .............................................. F16B 1/00
[52] U.S. Cl. ........................................ 403/24; 403/12; 403/373; 403/290
[58] Field of Search ...................... 403/290, 373, 12, 24

[56] References Cited

U.S. PATENT DOCUMENTS

| | | |
|---|---|---|
| 2,394,729 | 2/1946 | Tinnerman . |
| 3,999,583 | 12/1976 | Nelson . |
| 4,504,164 | 3/1985 | Bien . |
| 4,537,523 | 8/1985 | Haldric .................................. 403/12 |

FOREIGN PATENT DOCUMENTS

| | | |
|---|---|---|
| 128813 | 12/1984 | European Pat. Off. . |
| 1446538 | 12/1965 | France . |
| 2388161 | 11/1978 | France . |
| 2555263 | 5/1985 | France . |

*Primary Examiner*—Andrew V. Kundrat
*Attorney, Agent, or Firm*—Wenderoth, Lind & Ponack

[57] ABSTRACT

A coupling device comprises a shackle (20) mounted to be pivotable about an axis (21) orthogonal to branches (22) of the shackle for surrounding a stem (12), a locking mechanism having a screw (31) and a nut (32), and a clip (40). The nut has a bevel (320), an orientation maintaining arrangement (321) and a cam (322) together with a brake (33). The clip is provided with elastically yieldable legs (41) for maintaining the clip in position, and arm (43) elastically biasing the nut (32) and, optionally, a safety strip (44) having a hook (440). This device permits easily, rapidly and reliably coupling the shackle and the stem associated with driving and driven shafts. The coupling device is applied in the steering device of an automobile wherein the shackle is connected to a yoke of a universal joint associated with a shaft, and wherein the stem is connected to a gear wheel of the steering box.

22 Claims, 3 Drawing Sheets

COUPLING DEVICE AND THE APPLICATION THEREOF IN PARTICULAR IN AN AUTOMOBILE STEERING DEVICE

BACKGROUND OF THE INVENTION

The present invention relates to coupling devices which permit interconnecting a driving shaft to a driven shaft, such as a rod having an end stem of non-circular section and a shackle having a U section and, more particularly, a coupling device of this type which may be rapidly and reliably placed in position and in service.

In many technical fields, it is necessary to couple two shafts, for example a rod to an element such as a shackle, each associated with a shaft so as to connect the shafts in rotation.

This type of situation occurs, for example in the automobile industry, when the stem of a gear wheel of a steering box must be associated with the jaw of a universal joint connected to a shaft of a steering column.

A technique at present employed consists in providing that the shackle associated with the shaft to be connected to the gear wheel stem be connected to one of the jaws of the universal joint in such manner as to be pivotable about one of the axes of a spider element of the universal joint and arranging that this shackle caps a stem of non-circular section of the gear wheel. The stem, comprising a non-circular section of the rod, is trapped within the shackle, and held fast by fixing means.

These fixing means are usually formed by a screw-threaded pin provided on its periphery with cams, and which is mounted in the shackle and then clamped on the shackle by means of a nut. The pin is located in such manner that the cams of its periphery urges, into the inner end of the shackle, the stem comprising a non-circular section of the rod, and then the stem is clamped by screwing the nut on the end of the screw-threaded body of the screw which projects out of the shackle. If a lock-nut is used, it is conventional to screw the latter on the pin engaged in the shackle. After a few rotations of the nut, the pin encounters the locking part of the nut and the tightening torque increases. In continuing the screwing of the nut, the nut then drives the pin in rotation therewith and one of the cams of the pin comes in contact with the stem, which it then urges towards the inner end of the shackle. An additional screwing thereafter effects the locking of the assembly.

Although this technique is generally satisfactory, in service it is far from being reliable and far from being without drawbacks when assembling the parts.

As will be easily understood, if, when the shackle has been pivoted over the stem for capping the stem, the shaft carrying the universal joint turns through a semi-rotation before the fixing means have been placed in position, the shackle can be disengaged by pivoting in the opposite direction under the effect of gravity. The whole of the coupling operation must then be repeated.

If such a situation occurs upon assembly, however disagreeable this may be, it is without gravity.

However, if the fixing means become untightened and escapes from the latter, there is a danger of the latter becoming disengaged, as previously explained, and the initially coupled shafts are no longer coupled. This insidious situation is, as can be easily imagined, particularly dangerous if it concerns an automobile steering device.

Such an assembly is usually carried out in the engine compartment of a vehicle, where space is particularly restricted. In order to place the pin and nut in position, the operator must use both hands at the same time. This is particularly delicate if it is considered that, apart from the fact that the free space available to the operator is limited, access thereto is very often difficult.

SUMMARY OF THE INVENTION

An object of present invention is to overcome the drawbacks of the known technique by providing a device that is rapidly assembled, is reliable, and is capable of being assembled with one hand.

The invention provides a rapid safety coupling device for coupling a driving shaft and a driven shaft and for, in particular, interconnecting a rod having a stem of non-circular section and a shackle having a U section pivotable about an axis orthogonal to the axis of the shafts and orthogonal to branches of the U section. The branches are in confronting relation to each other, and are provided with fixing means extending there through for trapping and clamping the stem in a passage defined by the branches.

The coupling device comprises a clip or fastener which is composed of an elastic material and has a generally U shape adapted to be placed astride the shackle. The clip is provided with two substantially parallel legs cooperating with the corresponding confronting branches of the U section so as to be fixed thereto by means of maintaining elements on the branches and an arm which is disposed adjacent to one of the legs of the clip and is adapted to cooperate with a part of the fixing means in such manner as to urge the part elastically and cause it to have a tendency to project into the passage between the branches.

Another feature of this device is that the part of the fixing means urged by the arm of the clip is constituted by a nut which has a cam and a bevel adapted to cooperate with the stem. One of the branches has an orifice extending therethrough, and the nut is engaged in the orifice in such a manner as to be slidable therein and to be rotatable therein only through a limited angle. The nut is so oriented that its bevel projects elastically between the branches in the direction toward the interior of the branches under the action of the arm, so as to permit the insertion and then the retention of the stem in the shackle.

BRIEF DESCRIPTIONS OF THE DRAWINGS

Further features of the invention will be apparent from the following description and claims with reference to the accompanying drawings, which are presented solely by way of example, and in which:

DESCRIPTION OF THE PREFERRED EMBODIMENTS

Hereinafter, only that which concerns the invention will be described. For the rest, one skilled in the considered art will be able to derive from conventional structures available to him solutions of the requirements he is faced with.

Figure 1:
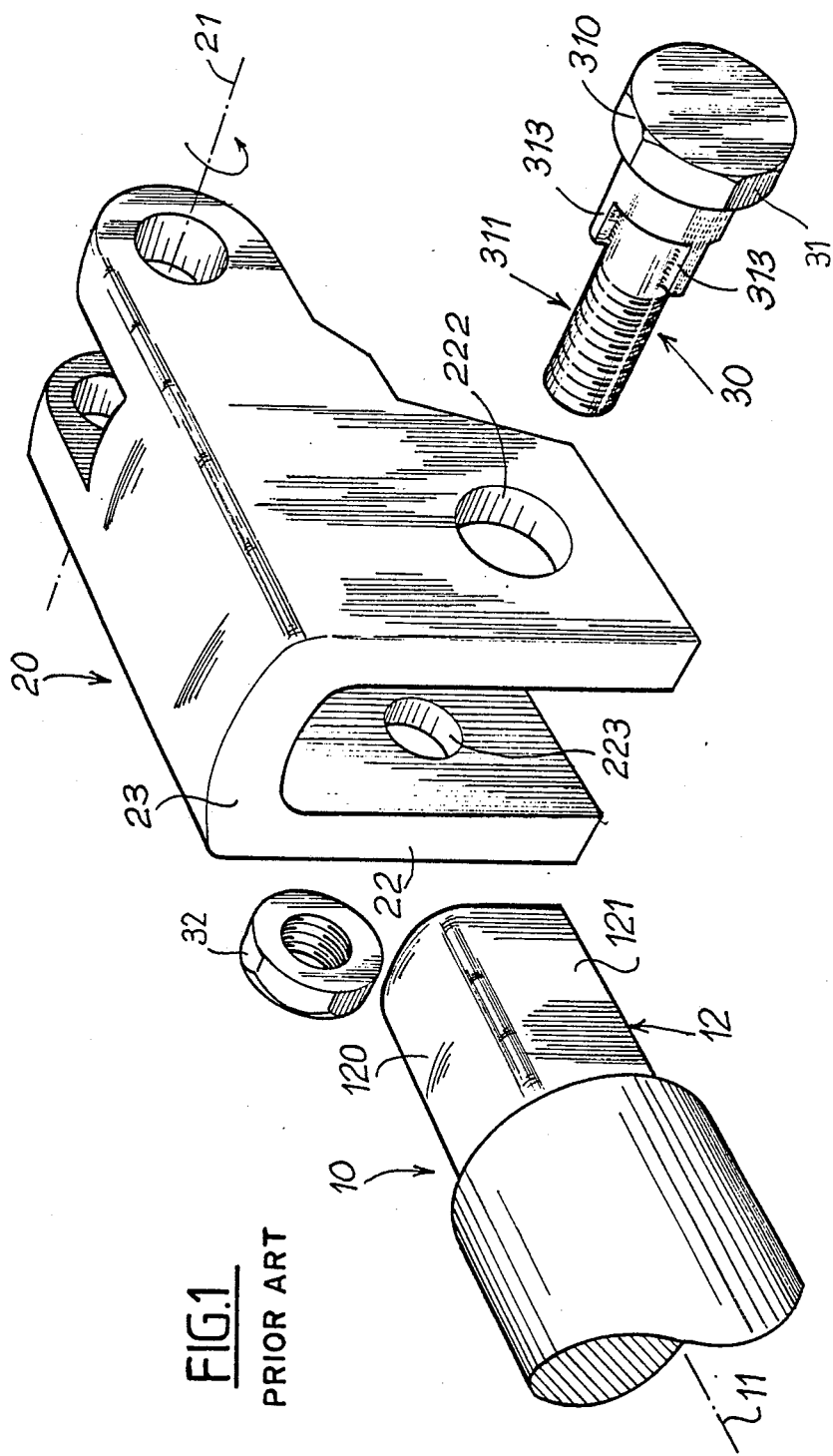
FIG. 1 is an exploded sectional view of a coupling device according to the prior art.

Reference will now be made to FIG. 1, which is a diagrammatic exploded perspective view of a coupling device according to the prior art.

Hereinafter, the same reference characters will be employed for designating similar elements whether they concern the prior art or the invention.

As can be seen, the device according to the prior art mainly comprises a shaft 10, a shackle for a yoke 20 associated with another shaft (not shown) and fixing means 30.

The shaft 10 is in this case a rod, which, is for example, maybe connected to a gear wheel of an automobile steering box. This rod has an axis 11 along which extends an end stem 12 having a non-circular section 120. This non-circular section is, for example obtained by forming three flat faces 121, only one of which is shown in FIG. 1, on the initially cylindrical stem. As will be seen hereinafter, the remaining cylindrical sector facilitates positioning.

The shackle or yoke 20 is, for example, connected to a jaw or yoke of a universal joint with which it forms a single piece, as illustrated. This shackle is pivotable about an axis 21, for example one of the axes of trunnions of spider element of the universal joint (not shown), in the direction indicated by the arrow. As can be seen, this axis 21 is orthogonal to both the axis 11 of the rod and to the plane of branches 22 of the shackle. These branches 22 define along with a bridge portion 23 interconnecting them, a passage (having no reference character) adapted to receive the stem 12.

As can be seen, an aperture 222 and an orifice 223 extend through the branches in alignment with each other. This aperture and the orifice are cylindrical and have different diameters.

The fixing or locking means 30 comprises a screw 31 and a nut 32. As illustrated, the screw has a head 310 and a body 311, a part of which has screw threads (having no reference character), whereas another part carries cams 313.

In order to interconnect the rod 10 and the shackle 20 in the device according to the prior art, the procedure is as follows.

One of the shafts is assumed to be equipped with a universal joint, of which the shackle is a part, and the relative axial positions of this shaft and the shaft 10 are such that the stem 12 is on a path that the shackle 20 will describe in pivoting about axis 21. Further, the shafts have relative orientations which permit the engagement of the stem in the passage of the shackle, and the shackle is inclined relative to the illustrated position toward the upper part of the Figure.

The shackle is pivoted about its axis 21 in the direction of the arrow in such manner as to place itself on the stem 12, which it then straddles. The screw is then engaged in the suitable direction in the aperture and orifice of the branches of the shackle, and provided with its nut.

The screw is then rotated in such a manner that one of its cams 313 comes to bear against one of the flat faces 121 of the stem so as to urge the stem toward the inner end of the passage against the bridge portion 23, which interconnects the two substantially parallel branches 22 of the shackle. Any transverse play is in this way eliminated The nut is then tightened so as to immobilize the stem of the rod between the branches of the shackle. As mentioned before, it is also possible to turn the nut for this purpose, the nut being preferably of the lock-nut type.

It will easily be imagined that, if in the course of the assembling operation the shaft carrying the shackle turns through a semi-rotation relative to the illustrated situation, before the screw is engaged at least partly in the branches of the shackle so that it extends slightly under the stem, the shackle would tilt under the effect of its own weight and would be disengaged from the stem. It would then be necessary to commence by again turning the shaft through a semi-rotation before it is possible to repeat the operation.

It will therefore be understood that this technique, with all its risks, is not very reliable and is the cause of loss of time in the course of the assembling operation in the workshop.

Apart from this drawback, it can be easily seen that, if the screw and the nut become untightened, caused for example by vibrations, there is a risk of the nut becoming separated from the screw, and the screw can then become disengaged. If the screw travels out of the shackle and becomes sufficiently separated from the shackle, there is a risk that the shackle will become disengaged from the stem, as explained before in the description of the assembling operation. If such a situation occurs when driving an automobile vehicle, it will be immediately understood that the driver no longer has control over the steering of his vehicle. This may be the cause of very serious and even fatal accidents.

An object of the invention is to overcome these types of difficulties by arranging that the device according to the invention permits a rapid assembly and a reliable fixing and also is very easy and especially convenient to use.

Figure 2:
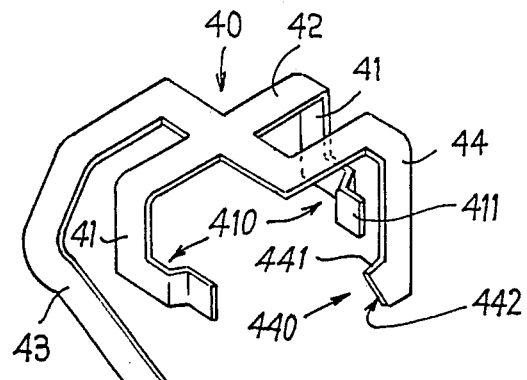
FIG. 2 is a perspective view of an embodiment of a clip or fastener of the coupling device according to the invention.

Reference will now be made in particular to FIGS. 2 and 3 which illustrate an embodiment of a device according to the invention.

The device according to the invention comprises, in addition to other elements, a clip or fastener 40.

As can be seen, this clip, which is made from an elastic material, comprises two substantially parallel legs 41 interconnected by a transverse bar 42 so as to have a generally U-shaped configuration. Also connected with the bar is an arm 43 and, optionally, a strip 44, reference to which will be made hereinafter.

As illustrated, each leg 41 is provided, in proximity to its free end, with maintaining means 410, for example produced by oppositely bent folds 411 in an approximately Z configuration. The function of the maintaining means will be clear hereinafter.

The arm 43 is adapted to elastically cooperate with the nut 32.

The strip 44 terminates in a hook 440 which defines a support surface 441 and a chamfer 442.

This clip normally has the configuration illustrated in FIG. 2.

The coupling device according to the invention comprises fixing or locking means 30 whose nut 32 is provided with a bevel 320, an orientation fool-proof means 321, at least one cam 322 and, optionally, a nut-locking means 33, which may be a conventional lock nut brake.

Figure 3A:
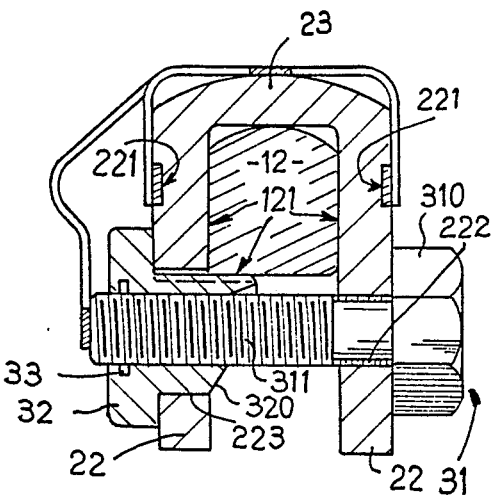
FIGS. 3A, 3B and 3C are diagrammatic detail views of the embodiment of the invention shown in FIG. 2 in different stages of assembly.
Figure 3C:
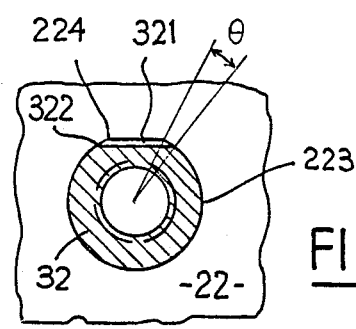

As can be seen in particular in FIGS. 3A and 3C, the aperture 222 of the device according to the invention is preferably tapped and the orifice 223 is not cylindrical, but has a contour which is complementary to that of the orientation fool-proof means 321, thus providing the fool-proof aspect. These complementary contours are so chosen that the nut 32 engaged in the branch is capable of axially sliding in orifice 223, but can only rotate therein through a relatively limited angle $\theta$. This is achieved, for example, by arranging the orientation fool-proof means 321 in the form of a flat face and by providing the orifice 223 with a cord portion 224, as clearly shown in FIG. 3C. The difference in the dimensions of the flat face and the cord portion allows a rotation through the angle $\theta$. Further, as will be seen hereinafter, the edge of the flat face acts as a cam 322.

Initially, the shackle 20 is provided with the nut 32 and the clip or fastener 40 is mounted thereon in such a manner as to straddle the shackle. In such a situation, the nut is slidable along its axis and can only turn through a small angle $\theta$, which is relatively small, owing to the cooperation between its flat face 321, which may encounter the cord portion 224 of the orifice 223. This also permits suitably orienting, without any possible error (fool-proof), the nut in such a manner that its bevel 320 projects between the branches 22 in the direction to converge inwardly of the shackle, as illustrated.

The clip which straddles the shackle is immobilized on the latter by its maintaining means 410, which are preferably engaged in suitable cavities 221 in the branches, as illustrated.

Figure 3B:
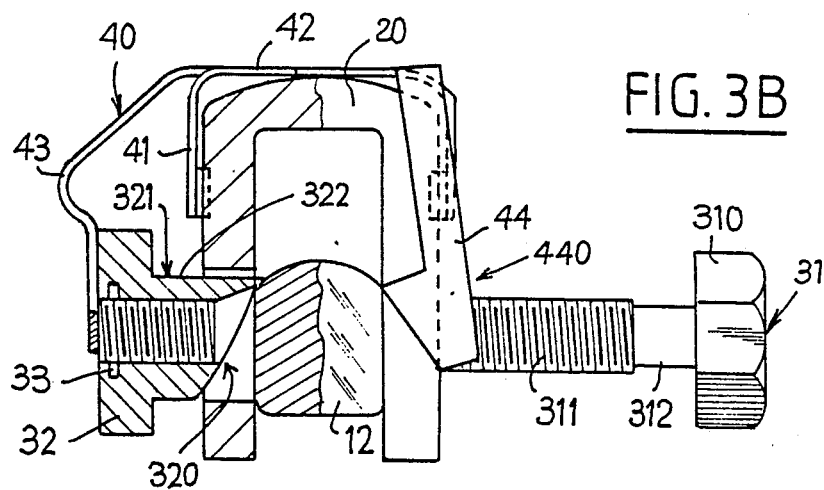

Further, as can be seen in FIGS. 3A, 3B, the arm 43 bears against the nut 32, which it maintains in its orifice 223, and elastically biases the nut so as to retain it therein by urging it toward the other branch.

Initially, only the first threads of the body 311 of the screw are engaged in the tapped hole 222, so that the screw does not encroach on the passage defined by the two branches 22 and the bridge 23 of the shackle 20.

Thus, only the nut 32 partly and elastically projects into this passage, the bevel 320 of the nut facing away from the bridge 23.

The shackle is then pivoted about its axis 21 in such a manner that it caps the stem 12 of the rod 10. The bevel 320 of the nut 32 then encounters the stem, preferably on a non-planar or inclined face to facilitate the insertion of the stem as illustrated. By exerting a force on the shackle, the stem urges the nut back in opposition to the elastic biasing of the arm 43 until the stem escapes from the bevel. The stem of the rod is then located within the branches and the bridge of the shackle, it being retained by the flat face 322 of the nut 32.

It is then possible to still further engage the screw 31 in the tapped hole 222 until it is engaged in the nut. This may be facilitated by providing a tapered entrance, for example a conical entrance, to the nut as illustrated in FIG. 3A and 3B.

When the screw is sufficiently engaged in the nut 32, it encounters the brake 33, for example of the commercially available type named Nylstop, the brake 33 being the locking feature of the lock nut 32. It is then necessary to develop a greater torque in order to continue the screwing. When this greater torque is developed, the screw 31 rotates the nut 32 through an angle $\theta$ in its orifice 223, and its cam 322 comes to bear against the face of the stem 12, which is close thereto. The cam then urges the stem until the stem is placed in abutment against the bridge 23 at the inner end of the passage. By continuing the screwing of the screw 31 in the nut 32, the stem is inserted between and placed flat against the branches of the shackle. The presence of the recess 312 between the head 310 and the body 311 of the screw 31 permits the tightening.

Thus it can be seen that the stem of the rod is in this way completely locked or blocked in the shackle.

The assembly operation is reliable and wastes no time. Indeed, as soon as the stem is inserted in the shackle and has passed through and escaped from the nut, the nut returns to the passage and prevents the stem from moving out of the shackle, even before the screw is partly placed under the stem. Furthermore, all this may be achieved with the use of only one hand.

If the clip of the device according to the invention is provided with the strip 44 disposed in such manner that its hook is normally at least partly in vertical alignment with the passage, it can be seen (FIG. 3B) that the hook is also urged outwardly at the moment of the pivoting of the shackle on the rod, and that the hook thereafter resumes its position elastically when the stem has moved pass and escaped therefrom. This results from the presence of the chamfer 442 and the support 441.

The stage in which the stem is inserted in the passage of the shackle is clearly illustrated in FIG. 3B, where the nut 32 and the strip 44 are both urged outwardly by the stem in opposition to the elastic biasing actions exerted independently thereon.

This procedure is similar to that which causes the temporary retraction of the nut when the shackle is pivoted on the stem.

The assembly is illustrated in FIG. 3A in its final position, wherein which the stem is locked in the shackle.

Even before locking and clamping, the stem is retained in the shackle as soon as it has passed beyond and escaped from the nut and, as the case may be, from the hook of the strip 44.

If the screw and the nut now became completely unscrewed and disengaged from the shackle, it can be seen that this strip with its hook would retain the stem in the shackle, where it would, however, no longer be clamped. This absence of clamping will result in a clearance which would be immediately noticed by the driver, owing to the play he might notice in the driving of the vehicle. This hindrance, although unpleasant, would, however, not be fatal, since the transmission of the torque between the driving and driven shafts continues because of the shackle continuing to surround the stem, from which it cannot become disengaged.

All the advantages of the coupling device according to the invention can therefore be seen, the device in all cases facilitating the assembly and being moreover capable of providing safety.

Figure 4:
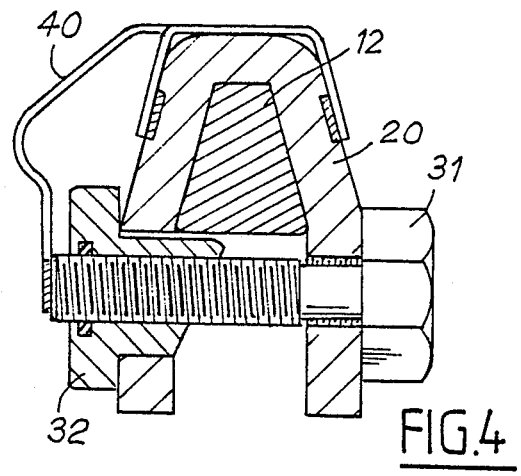
FIG. 4 is a view similar to FIG. 3A of a modification of the invention.

With reference now to FIG. 4, in which is shown a variant of the device according to the invention, the stem of the rod and the shackle no longer have a non-circular cross-sectional shape with parallel faces, but have faces which are inclined in the manner of a truncated prism. As concerns the rest of the structure, the positioning and the operation, these features are the same as explained with respect to the embodiment illustrated in FIG. 3A, 3B, 3C.

Figure 5:
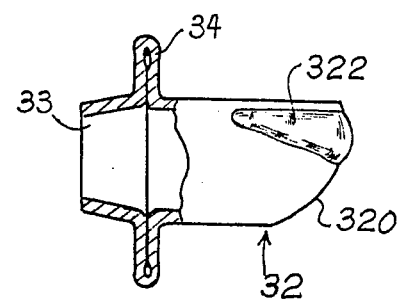
FIG. 5 is a view of a modified component according to the invention.

In FIG. 5, another embodiment of the nut of the coupling device according to the invention is shown. In this case, the nut is obtained by deformation of a section of a tube. This tube section is so shaped as to have a bevel 320 and a cam 322 and to serve also as a brake 33 following on a bent portion 34.

The bent portion 34 acts as a support for absorbing the axial forces. The brake 33 is obtained by imparting to the tube an outwardly convergent conicity, for example a local deformation toward the interior of the tube. The brake 33 will act, in operation, similarly to the brake 33 in the above embodiments. When the screw becomes engaged with brake portion 33, the threads will grip the brake 33 and tend to turn the nut in the direction of threading, thus turning the cam 322 to hold the stem in place in the passage of the shackle.

Figure 6A:
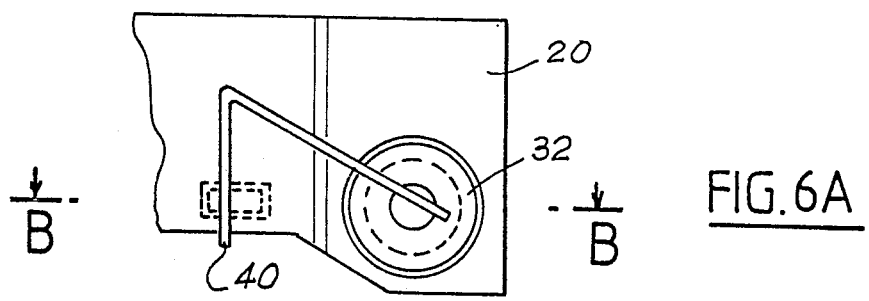
FIGS. 6A and 6B are views of another embodiment of a clip of the device according to the invention in the course of assembly.
Figure 6B:
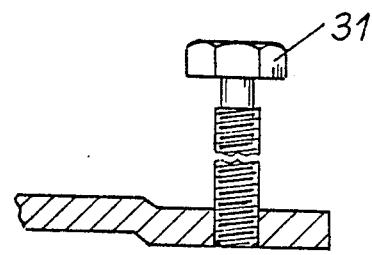
Figure 6B:
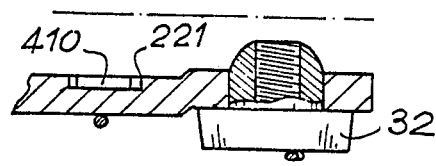

Another embodiment of the clip of the device according to the invention is shown in FIGS. 6A and 6B.

In this embodiment, the clip is not provided with a strip having a hook, and instead of being obtained from an elastically yieldable plate, for example a metal plate of glucinium bronze, it is obtained, from a rigid and elastically yieldable wire or thread-like member, preferably of metal such as piano wire. It can in this case be observed that the cavities 221 for receiving the maintaining means 410, here arranged as a loop, are no longer provided on the outer sides of the branches of the shackle, but on the inner sides of these branches. Thus, as can be seen from the figures, the rigid wire is held in cavity 221, passes around the branch of the shackle, and then extends upwardly and then diagonally downwardly to the nut 32 to elastically bias the nut in towards the passage of the shackle.

In order to ensure a good immoblization of a clip on the shackle, the maintaining means 410 are employed, which cooperate with the cavities 221. The device can also be arranged to avoid the use of cavities. For example, whether the clip is made from a plate or a wire, maintaining means can be arranged so that the maintaining means is in the form of projections which are in confronting relation and in proximity to each of the free ends of the legs 41 and which the shape of a cone having a sharp point or a truncated cone having a sharp edge. Such a point or edge is inserted into the branches of the shackle and fasten onto the clip. Such an arrangement may be obtained by striking on a center-punch, which may pass completely through the metal, or like means when cutting the wire.

There will now be described a variant of the orientation fool-proof means 321 (not shown).

In this case, a nut with its flat face engaged in an orifice 223 and having a chord portion 324 is not used; instead the arm 43 is used directly. The nut having a cam and bevel and the orifice are then cylindrical, and may rotate with respect to each other with no imposed angular limit.

For this purpose, there is provided on the outer side of the nut against which the arm 43 normally rests an approximately radial groove whose width is suitable for the width of the arm, so that the arm can freely engage therein. The relative positions of this groove and the bevel 320 are such that, when the nut is screwed into its orifice and the arm is elastically inserted in the groove, the bevel is oriented outwardly of the passage of the shackle away from the bridge 23.

To this end, the free end of the arm 43 is bent approximately at a right angle, so that it terminates in an extension capable of freely penetrating the tapped hole of the nut. The axial length of this extension is such that, with the arm inserted in the groove, its end portion extends inwardly beyond the brake 33.

The clip is placed in position on the shackle in such a manner that the arm rests in the groove of the nut and the extension of the arm is disposed in the bore of the nut.

The nut is in this way prevented from rotating and is correctly oriented by the arm bearing in the groove, thus forming the orientation fool-proof means 321.

The coupling is achieved as indicated for the other embodiments.

When the screw is screwed into the nut, the screw encounters first of all the end of the extension of the arm, which it progressively urges back as it is engaged in the nut. After a certain number of turns or fractions of a turn, the extension has been sufficiently urged back to allow the arm to become disengaged from the groove. The nut, previously held against rotation, is now free to rotate. When the screw encounters the brake, it drives the nut in rotation therewith until its cam urges the stem to the inner end of the passage of the shackle. Pursuing the screwing then ensures the final locking, as already explained.

The foregoing will show the interest and the advantages of the coupling device according to the invention, which contributes to facilitating the assembly in the workshop and to increased safety in operation.

We claim:

1. A rapid coupling device for interconnecting a driving shaft and a driven shaft, comprising:
    a rod for connection to one of the shafts, said rod defining a stem portion having a longitudinal axis and a non-circular section;
    a shackle for connection to the other of the shafts, said shackle comprising a U section defined by two spaced-apart confronting branches and a bridge portion connecting said branches and defining a passage between said branches, said shackle being pivotable about an axis orthogonal to said longitudinal axis of said stem and to said branches of said shackle;
    locking means extending through said branches for trapping and clamping said stem in said passage of said shackle; and
    a clip made of an elastically yieldable material, said clip having a substantially U shaped configuration for straddling said shackle with two substantially parallel legs cooperative with respective said confronting branches of said shackle, said clip further comprising means on said parallel legs for fixing and maintaining said legs on said respective branches and an arm disposed on said clip adjacent to one of said legs and cooperative with said locking means.

2. The rapid coupling device as set forth in claim 1, wherein:
    said locking means comprises a nut having a bevelled portion and a cam portion; and
    one of said branches comprises an orifice wherein said nut is slidably engageable but rotatable only through a restricted angle, said nut oriented in said orifice such that said bevelled portion projects into said passage of said shackle in an inwardly convergent direction and said cam portion extends inwardly toward said bridge portion of said shackle, said arm of said clip engaging said nut to elastically bias said nut toward said passage such that said bevel is elastically movable upon insertion of said stem into said shackle to permit entry of said stem into said passage and elastically return to position underneath said stem once said stem is located in said passage adjacent said bridge portion of said shackle.

3. The rapid coupling device as set forth in claim 2, wherein:
said nut comprises means for orienting said nut in said orifice in a predetermined angular position, said means comprising said nut having a profile substantially complementary to the profile of said orifice.

4. The rapid coupling device as set forth in claim 3, wherein:
said means for orienting allows said nut to rotate in said orifice only through a relatively small angle.

5. The rapid coupling device as set forth in claim 3, wherein:
said means for orienting further comprises a flat face on said nut, said cam portion of said nut comprising one edge of said flat face; and
said profile of said orifice has a portion defining a chord.

6. The rapid coupling device as set forth in claim 2, and further including:
a brake cooperative with said nut for preventing unscrewing of said nut.

7. The rapid coupling device as set forth in claim 2, wherein:
said locking means comprises a screw;
the other of said branches of said shackle has an aperture; and
said screw is engaged in said aperture so as to be capable of screwing into said nut.

8. The rapid coupling device as set forth in claim 7, wherein:
said aperture is a tapped hole.

9. The rapid coupling device as set forth in claim 7, wherein:
said screw comprises a head, a screw-threaded body, and a recess between said head and the screw threads of said screw threaded body.

10. The rapid coupling device as set forth in claim 1, wherein said clip further comprises:
an elastically yieldable strip having a hook at a terminal end thereof, said hook disposed on said clip relative to said shackle so as to be at least partially aligned with said passage of said shackle.

11. The rapid coupling device as set forth in claim 10, wherein:
said hook has a chamfer thereon inclined in an inwardly convergent direction, relative to said passage, and a support face oriented substantially orthogonally with respect to said branches of said shackle for permitting the insertion and retention by said support face of said stem in said shackle.

12. The rapid coupling device as set forth in claim 1, wherein:
said means on said parallel legs for fixing and maintaining said legs on said respective branches comprises a fold on each said leg adjacent its free end.

13. The rapid coupling device as set froth in claim 1, wherein:
said means on said parallel legs for fixing and maintaining said legs on said respective branches comprises a loop on each said leg adjacent its free end.

14. The rapid coupling device as set forth in claim 1, wherein:
each said branch has a cavity therein for receiving said means for fixing and maintaining said legs on said branches.

15. The rapid coupling device as set forth in claim 1, wherein:
said clip is made from an elastically yieldable plate.

16. The rapid coupling device as set forth in claim 1, wherein:
said clip is made of a substantially rigid but elastically yieldable thread-like member.

17. The rapid coupling device as set forth in claim 1, wherein:
said branches of said shackle have parallel confronting faces.

18. The rapid coupling device as set forth in claim 1, wherein:
said branches of said shackle have inclined confronting faces.

19. The rapid coupling device as set forth in claim 2, wherein:
said nut comprises means for orienting said nut in said orifice in a predetermined angular position, said means comprising a groove on an outer side of said nut opposite to said bevelled portion of said nut; and
said arm of said clip has a bent terminal extension thereof, said arm is adapted to at least partly rest in said groove of said nut and said bent terminal extension of said arm is adapted to extend into the tapped bore of said nut.

20. The rapid coupling device as set forth in claim 1, wherein:
said means for fixing and maintaining said legs on said respective branches comprises sharp projections for insertion into said branches of said shackle.

21. The rapid coupling device as set forth in claim 1, and further comprising:
a universal joint having a universal joint yoke rigid with said shackle and a spider element, wherein said axis about which said shackle is pivotable is the axis of said spider element.

22. In an automobile steering mechanism, a first shaft having an end stem, a second shaft, and a rapid coupling for interconnecting said first and second shafts, said rapid coupling comprising:
said end stem of said first shaft, said end stem having a longitudinal axis and a non-circular section;
a shackle connected to said second shaft, said shackle comprising a U section defined by two spaced apart confronting branches and a bridge portion connecting said branches and defining a passage between said branches, said shackle being pivotable about an axis orthogonal to said longitudinal axis of said stem and to said branches of said shackle;
locking means extending through said branches for trapping and clamping said stem in said passage of said shackle; and
a clip made of an elastically yieldable material, said clip having a U shaped configuration for straddling said shackle with two substantially parallel legs cooperative with respective said confronting branches of said shackle, said clip further comprising means on said parallel legs for fixing and maintaining said legs on said respective branches and an arm disposed on said clip adjacent to one of said legs and cooperative with said locking means to bias said locking means toward said passage of said shackle such that said locking means projects at least partly into said passage.

* * * * *